(12) United States Patent
Han et al.

(10) Patent No.: US 12,366,013 B2
(45) Date of Patent: Jul. 22, 2025

(54) HIGH HEAT-RESISTANT GRAPHENE OXIDE, METHOD FOR MANUFACTURING CONDUCTIVE GRAPHENE FIBER BY USING SAME, AND CONDUCTIVE GRAPHENE FIBER MANUFACTURED THEREFROM

(71) Applicant: KOREA ELECTROTECHNOLOGY RESEARCH INSTITUTE, Changwon-si (KR)

(72) Inventors: Joong Tark Han, Changwon-si (KR); Jung Hoon Kim, Changwon-si (KR); Joon Young Cho, Changwon-si (KR); Geon Woong Lee, Changwon-si (KR); Jong Hwan Park, Gimhae-si (KR); Seon Hee Seo, Changwon-si (KR); Soo Yeon Jeong, Changwon-si (KR); Seung Yol Jeong, Changwon-si (KR); Hee Jin Jeong, Jeonju-si (KR)

(73) Assignee: KOREA ELECTROTECHNOLOGY RESEARCH INSTITUTE (KR)

( * ) Notice: Subject to any disclaimer, the term of this patent is extended or adjusted under 35 U.S.C. 154(b) by 251 days.

(21) Appl. No.: 17/702,933

(22) Filed: Mar. 24, 2022

(65) Prior Publication Data
US 2022/0243365 A1    Aug. 4, 2022

Related U.S. Application Data

(63) Continuation of application No. PCT/KR2020/010153, filed on Jul. 31, 2020.

(30) Foreign Application Priority Data

Sep. 27, 2019   (KR) .................. 10-2019-0119733
Nov. 5, 2019    (KR) .................. 10-2019-0140263
Mar. 25, 2020   (KR) .................. 10-2020-0036001

(51) Int. Cl.
*D01F 9/14*    (2006.01)
*C01B 32/184*  (2017.01)
(Continued)

(52) U.S. Cl.
CPC .............. *D01F 9/14* (2013.01); *C01B 32/184* (2017.08); *C01B 32/198* (2017.08); *D01D 1/02* (2013.01);
(Continued)

(58) Field of Classification Search
CPC ... D01F 9/14; D01D 1/02; D01D 5/06; D01D 10/02; C01B 32/184; C01B 32/198
See application file for complete search history.

(56) References Cited

U.S. PATENT DOCUMENTS 10,017,706 B1 *  7/2018  Loebick .................... C10L 1/16

FOREIGN PATENT DOCUMENTS

CN    104231294         * 12/2014
KR    1020150124821 A     11/2015
(Continued)

OTHER PUBLICATIONS

International Search Report (PCT/KR2020/010153), WIPO, Nov. 10, 2020.

*Primary Examiner* — Mathieu D Vargot
(74) *Attorney, Agent, or Firm* — Park & Associates IP Law Office (57) ABSTRACT

The present invention relates to a high heat-resistant graphene oxide, a method of manufacturing conductive graphene fiber from the same, and conductive graphene fiber manufactured by the method. The technical gist of the present invention is to provide high heat-resistant graphene oxide not having an oxygen-containing functional group such as a lactol group or a carboxyl group on the surface but having an oxygen-containing functional group such as an (Continued)

epoxy group or a hydroxyl group on the surface, thereby exhibiting thermal resistance and stability. In addition, the technical gist is also to provide a method of manufacturing conductive graphene fiber from the high heat-resistant graphene oxide and conductive graphene fiber manufactured by the method.

20 Claims, 9 Drawing Sheets

(51) Int. Cl.
*C01B 32/198* (2017.01)
*D01D 1/02* (2006.01)
*D01D 5/06* (2006.01)
*D01D 10/02* (2006.01)

(52) U.S. Cl.
CPC ............... *D01D 5/06* (2013.01); *D01D 10/02* (2013.01); *C01B 2204/22* (2013.01); *C01B 2204/24* (2013.01); *C01P 2002/84* (2013.01); *C01P 2002/86* (2013.01); *C01P 2002/88* (2013.01); *C01P 2004/02* (2013.01); *C01P 2004/03* (2013.01); *D10B 2401/16* (2013.01)

(56) References Cited

FOREIGN PATENT DOCUMENTS

| KR | 1020180019130 | A |   | 2/2018 |
|----|---------------|---|---|--------|
| KR | 20180039456   | A | * | 4/2018 |
| KR | 1020180039456 | A |   | 4/2018 |
| KR | 101927643     | B1|   | 12/2018|
| KR | 101973663     | B1|   | 4/2019 |
| KR | 1020190037055 | A |   | 4/2019 |
| WO | WO-2019066492 | A2| * | 4/2019 |

* cited by examiner

HIGH HEAT-RESISTANT GRAPHENE OXIDE, METHOD FOR MANUFACTURING CONDUCTIVE GRAPHENE FIBER BY USING SAME, AND CONDUCTIVE GRAPHENE FIBER MANUFACTURED THEREFROM

REFERENCE TO RELATED APPLICATIONS

This is a continuation of pending International Patent Application PCT/KR2020/010153 filed on Jul. 31, 2020, which designates the United States and claims priority of Korean Patent Application No. 10-2019-0119733 filed on Sep. 27, 2019, and Korean Patent Application No. 10-2019-0140263 filed on Nov. 5, 2019, and Korean Patent Application No. 10-2020-0036001 filed on Mar. 25, 2020 the entire contents of which are incorporated herein by reference.

FIELD OF THE INVENTION

The present invention relates to a high heat-resistant graphene oxide, a method of manufacturing conductive graphene fiber from the same, and conductive graphene fiber manufactured thereby.

BACKGROUND OF THE INVENTION

Graphene is a carbon allotrope having a thickness of one carbon atom, having only $sp^2$ hybrid structure, and having a plate-like two-dimensional structure connected in a hexagonal shape. Graphene has excellent electrical properties such as high electron mobility, high physical strength, and low contact resistance with organic electronic devices.

Graphene with these properties has been found in various applications such as supercapacitors, sensors, electrode active material for batteries and actuators, touch panels, flexible displays, high-efficiency solar cells, heat dissipation films, electromagnetic wave shielding films, seawater desalination filters, barrier films, and conductive fibers.

However, to obtain graphene, it is necessary to overcome the van der Waals force between each graphene layer of graphite and to exfoliate a single sheet of graphene from the graphite. For this reason, it is difficult to mass-produce graphene.

To solve the above problem, there was an attempt to mass-produce graphene by a method in which graphite is first oxidized to become graphite oxide, the graphene oxide is exfoliated into sheets of graphene oxide, and the resultant is synthesized into a dispersion.

Graphene oxide has a hydroxyl group and an epoxy group on the surface thereof and an oxygen-containing functional group such as a carboxyl group and a ketone group at the end thereof. Graphite oxide is hydrophilic due to the oxygen-containing functional group. When graphite oxide is added to water and subjected to ultrasonic treatment, it is easily exfoliated into a graphene oxide layer having a frame composed of one carbon atom thickness, and a very stable dispersion can be obtained in large quantities.

However, in the process of oxidation, the $sp^2$ hybrid structure changes to an spa hybrid structure, or the hexagonal structure collapses to generate a defect, so the excellent physical properties of graphene, including electrical conductivity, are lost. Thus, in the subsequent process, graphene oxide is reduced using a reducing agent or is treated at high temperature to remove oxygen-containing functional groups so that the $sp^2$ hybrid structure can be restored. As a result, reduced graphene oxide is generated, and the physical properties of the graphene oxide are restored.

In relation to this, hydrazine (HZ) is used as a reducing agent for chemical reduction. However, since the toxicity of such a reducing agent is a problem, it is preferable to remove the oxygen-containing functional group through heat treatment. Since the reduction process is performed by heat treatment in a vacuum, inert gas, or hydrogen gas environment, there are problems in cost increase and low energy efficiency. This is because the surface of graphene oxide contains a large number of carboxyl groups with a high degree of oxidation, and functional groups such as lactol groups are also present on the surface of graphene oxide. For this reason, graphene oxide is easily deteriorated at high temperatures. That is, graphene oxide has poor thermal stability.

For example, the document titled "Graphene Fiber manufactured by the Joule Heating Method, and Manufacturing Method Therefor" (Korean Patent Application Publication No. 10-2019-0037055) discloses that a source solution containing graphene oxide is spun into a coagulation solution to prepare graphene oxide fiber, the graphene oxide fiber is reduced with hydroiodic acid (HI) to produce primary graphene fiber, and the primary graphene fiber undergoes Joule heating to produce secondary graphene fiber. However, since a reducing agent such as hydroiodic acid is toxic when it comes into contact with moisture, it is preferable to remove the oxygen-containing functional group by heat treatment during the reduction. In most cases, the heat treatment is performed in a vacuum, inert gas, or hydrogen gas environment. Therefore, so there are limitations due to cost increase and energy efficiency. This means that the surface of graphene oxide contains a large number of carboxyl groups with a high degree of oxidation and oxygen-containing functional groups such as lactol groups, resulting in that graphene oxide is easily deteriorated at high temperatures. That is, graphene oxide has poor thermal stability.

In addition, the coagulant contained in the coagulation solution typically uses materials containing metal ions, such as calcium chloride ($CaCl_2$) and ferric chloride ($FeCl_3$), or alkaline materials such as potassium hydroxide (KOH) and sodium hydroxide (NaOH). For this reason, since metal ions are inevitably included in the finally manufactured graphene fiber, the heat resistance of the graphene fiber is not good, resulting in deterioration of electrical conductivity.

Therefore, there is an urgent need for technology development and research on graphene oxide that can be grafted with high heat-resistance graphene that does not burn at high temperatures and on conductive graphene fibers having thermal stability, rather than the development and research on improvement in electrical conductivity of conventional graphene oxide.

SUMMARY OF THE INVENTION

The present invention has been made to solve the above problems, and an objective of the present invention is to provide high heat-resistant graphene oxide having thermal stability whereby not burning even at high temperatures.

Another objective of the present invention is to provide a method of manufacturing conductive graphene fiber having thermal resistance and stability, the method using high heat-resistant graphene, not performing heat treatment in an environment of hot inert gas but performing heat treatment in an environment of air and in a temperature range in which thermal graphene oxide can maintain thermal resistance and stability.

A further objective of the present invention is to provide a conductive graphene fiber prepared by the method.

In order to solve the above technical problem, the present invention provides a high heat-resistant graphene oxide not having oxygen-containing functional groups such as a lactol group or a carboxyl group but having oxygen-containing functional groups such as an epoxy group and a hydroxyl group, on the surface thereof.

In the present invention, the graphene oxide is a high heat-resistant graphene oxide exhibiting thermal resistance and stability at 200° C. to 450° C.

In the present invention, the graphene oxide is a high heat-resistant graphene oxide formed by a method in which graphite and a chlorate-based oxidizing agent in the form of powder are mixed, concentrated nitric acid is added to the powder mixture for oxidation to form graphite oxide, and the graphite oxide is exfoliated under an alkali condition of pH 10 or higher obtained using a basic solution that has does not contain metal ions.

In order to solve another technical problem, the present invention provides a method of manufacturing conductive graphene fiber using high heat-resistant graphene oxide, the method including: a first step of preparing a spinning solution containing graphene oxide; a second step of wet-spinning the spinning solution to prepare a graphene oxide fiber; and a third step of producing a conductive graphene fiber by reducing the graphene oxide fiber through heat treatment. The graphene oxide includes an oxygen-containing functional group that is an epoxy group or a hydroxy group on the surface thereof but does not have an oxygen-containing functional group that is a lactol group or a carboxyl group on the surface thereof, thereby exhibiting thermal resistance and stability. The heat treatment is performed in an air environment in a temperature range in which the high heat-resistant graphene oxide exhibits thermal stability.

In the present invention, in the second step, the graphene oxide fiber is prepared by wet spinning the spinning solution in a coagulation bath containing a metal cation-free acid solution as a coagulant, and the graphene oxide fiber is formed by a mechanism in which epoxy groups or hydroxyl groups on the surface of the graphene oxide are hydrogen-bonded to each other by the acid solution, and the graphene oxide is connected to each other and solidified.

In the present invention, the acid solution may include at least one selected from formic acid (HCOOH), carbonic acid ($H_2CO_3$), oxalic acid ($H_2C_2O_4$), acetic acid ($CH_3COOH$), hydrochloric acid (HCl), nitric acid ($HNO_3$), and sulfuric acid ($H_2SO_4$).

In the present invention, the third step may be a process of reducing the high heat-resistant graphene oxide by heat treatment in an air environment of 200° C. to 450° C.

In order to solve a further technical problem, the present invention provides a conductive graphene fiber manufactured by the method.

According to the present invention to solve the above problems, there are the effects described below.

First, in the high heat-resistant graphene oxide of the present invention, among the oxygen-containing functional groups, carboxyl groups and lactol groups, which have a relatively higher degree of oxidation than epoxy groups and hydroxyl groups, do not exist on the surface at all. For this reason, the high heat-resistant graphene oxide does not burn at 100° C. or higher, and even at 400° C. or higher, thereby satisfying the requirement of high-temperature stability. Therefore, the high heat-resistant graphene oxide can be used as a heat-resistant material. The high heat-resistant graphene oxide has the effect of exhibiting process stability in applications in which graphene oxide is exposed to high temperatures of 400° C. or higher.

Second, graphene oxide fibers manufactured by wet-spinning high heat-resistant graphene oxide exhibiting thermal resistance and stability because of the presence of an oxygen-containing functional group that is an epoxy group or a hydroxy group on the surface thereof but absence of an oxygen-containing functional group that is a lactol group or a carboxyl group on the surface thereof, can be manufactured through reduction that is performed by heat treatment in an air environment in a temperature range in which the high heat-resistant graphene oxide exhibits thermal stability.

Third, by wet spinning a spinning solution containing graphene oxide in a coagulation bath containing a metal cation-free acid solution as a coagulant, the epoxy groups or hydroxyl groups on the surface of graphene oxide are hydrogen-bonded with each other by the acid solution and coagulated. Therefore, there is an effect that can produce graphene oxide fiber with improved thermal resistance because of the absence of metal.

Fourth, since a large number of $sp^2$ bonds exist on the surface of graphene oxide, and hydroxyl and epoxy groups having a relatively lower oxidation degree than carboxyl and lactol groups exist on the surface of graphene oxide, after most of the hydroxyl and epoxy groups are removed at temperatures in a range of 200° C. to 250° C., the graphene oxide has thermal resistance and stability such that deterioration proceeds very slowly and is minimized. Thus, heat treatment, which was conventionally performed at a high temperature in the range of 800° C. to 1,200° C. in an inert gas environment, can be performed at a low temperature and in an air environment. Therefore, there is the effect of not only lowering the cost but also remarkably improving the convenience and efficiency of the process.

DETAILED DESCRIPTION OF THE INVENTION

Hereinafter, the present disclosure will be described in detail.

Prior to the description of the present invention, conventionally, graphite is oxidized using a strong acid and an oxidizing agent to produce graphite oxide, and exfoliation of the graphite oxide is performed. Therefore, conventional graphite is structured to have, on the surface or at the edge, highly chemically reactive oxygen-containing functional groups such as epoxy groups, carbonyl groups, carboxyl groups, hydroxyl groups, and lactol groups. That is, conventional graphene oxide is formed by introducing an oxygen-containing functional group to graphite through oxidation of the graphite.

However, when conventional graphene oxide is oxidized, the graphene oxide contains a large number of carboxyl groups having a relatively higher oxidation degree than epoxy groups and hydroxyl groups, and oxygen-containing functional groups such as lactol groups exist on the surface of the graphene oxide. Therefore, the graphene oxide is easily deteriorated at high temperatures such as 400° C. or higher, lacking thermal stability.

In particular, in the case of conventional graphene oxide which is well known, research have been focused on improvement in conductivity through functional group control rather than on improvement in thermal resistance. However, the present invention approaches graphene oxide in terms of heat resistance rather than in terms of conductivity.

According to the present invention, graphene oxide is formed not to have lactol groups or carboxyl groups from the beginning, and epoxy groups and hydroxy groups are then partially removed at 200° C. to 250° C. to produce graphene oxide with maximized thermal resistance. Graphite oxide is produced by oxidizing graphite such that lactol groups and carboxyl groups which have a higher oxidation degree than epoxy groups and hydroxy groups among one or more oxygen-containing functional groups are not present at all or are minimally present, and the graphite oxide then undergoes exfoliation. Thus, graphene oxide having stable thermal resistance to the extent that it has a solid content of 9% by weight in air at 200° C. and does not burn at 400° C. or higher. The present invention provides graphene oxide that can be used as a heat-resistant material due to the high thermal resistance, and conductive graphene fibers made from the graphene oxide.

In one aspect, the present invention relates a high heat-resistant graphene oxide not having oxygen-containing functional groups such as a lactol group or a carboxyl group but having oxygen-containing functional groups such as an epoxy group and a hydroxy group, on the surface thereof, thereby having thermal resistance and stability.

That is, in graphene oxide formed by oxidizing and exfoliating graphite, since lactol groups and carboxyl groups having a relatively high oxidation degree than epoxy groups and hydroxy groups among one or more oxygen-containing functional groups selected from the group consisting of an epoxy group, a hydroxy group, a lactol group, and a carboxyl group are not present on the surface, the graphene oxide does not burn at 400° C. or higher. However, the high heat-resistant graphene oxide will be described in greater detail in the description about a conductive graphene fiber manufacturing method, and thus a description thereof will be omitted here.

In another aspect, the present invention relates to a method of manufacturing a conductive graphene fiber by using high heat-resistant graphene oxide. The method is performed such that a spinning solution containing graphene oxide is prepared first, the spinning solution is wet-spun to prepare graphene oxide fiber, and the graphene oxide is reduced through heat treatment.

Figure 1:
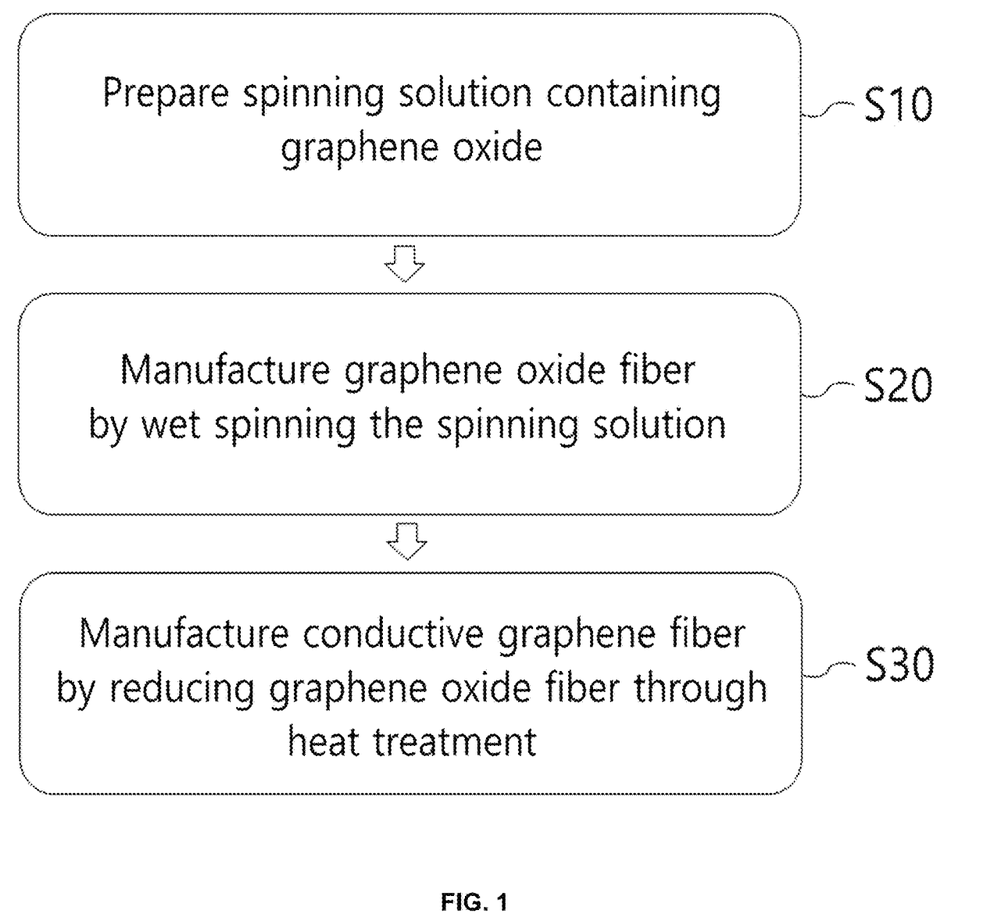
FIG. 1 is a flowchart illustrating a method of manufacturing conductive graphene fiber, according to the present invention.

In connection with this, FIG. 1 is a flowchart showing a method of manufacturing a conductive graphene fiber according to the present invention. Referring to FIG. 1, the method includes a first step S10 of preparing a spinning solution containing graphene oxide, a second step S20 of wet spinning the spinning solution to produce graphene oxide fiber, and a third step S30 of reducing the graphene oxide fiber through heat treatment to produce conductive graphene fiber.

According to the above-described manufacturing method, first, a spinning solution containing graphene oxide is prepared (S10).

Graphene oxide according to the present invention includes an oxygen-containing functional group, which is an epoxy group or a hydroxyl group, on the surface but does not include an oxygen-containing functional group that is a lactol group or a carboxyl group, on the surface, thereby exhibiting thermal resistance and stability. Thus, the graphene oxide can be thermally treated in air in a temperature range showing the thermal stability of graphene oxide. Accordingly, heat treatment, which was conventionally performed in an inert gas environment at a high temperature of 800° C. to 1,200° C., can be performed in air at a low temperature, thereby remarkably improving the process.

Figure 2:
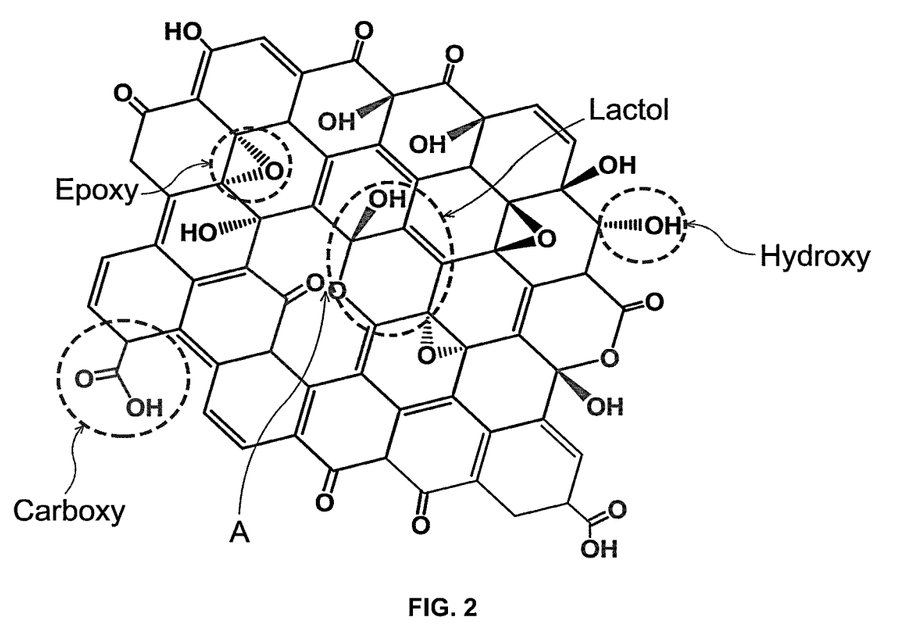
FIG. 2 is a chemical structure of graphene oxide having lactol or carboxyl groups on the surface, according to a conventional art.
Figure 3:
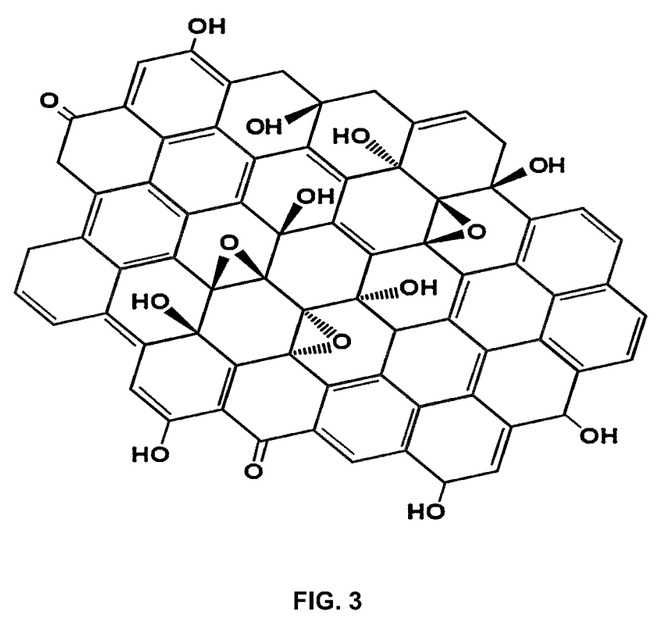
FIG. 3 is a chemical structure of high heat resistance graphene oxide having an epoxy group or a hydroxyl group on the surface, according to the present invention.

In connection with this, FIG. 2 shows the chemical structure of conventional graphene oxide in which a lactol group or a carboxyl group exists on the surface, and FIG. 3 shows the chemical structure of graphene oxide having high-heat resistance according to the present invention in which an epoxy group or a hydroxyl group exists on the surface.

Referring to FIG. 2, the conventional graphene oxide is manufactured by a method in which graphite is oxidized using a strong acid and an oxidizing agent to produce graphite oxide, and exfoliation of the graphite oxide is performed. Therefore, the conventional graphite is structured to have, on the surface or at the edge thereof, all of highly chemically reactive oxygen-containing functional groups such as epoxy groups, carbonyl groups, carboxyl groups, hydroxyl groups, and lactol groups. That is, since the conventional graphene oxide is formed by introducing oxygen-containing functional groups into graphite through oxidation of the graphite, carboxyl and lactol groups, which have a relatively higher oxidation degree than epoxy groups and hydroxyl groups, are present on the surface of the graphene oxide. Therefore, the graphene oxide is easily deteriorated at high temperatures such as 400° C. or higher, meaning that the graphene oxide does not have thermal stability.

On the other hand, the high heat-resistant graphene oxide used in the present invention shown in FIG. 3 has epoxy groups and hydroxyl groups on the surface and but does not have carboxyl groups and lactol groups having a relatively high oxidation degree on the surface.

Figure 4A:
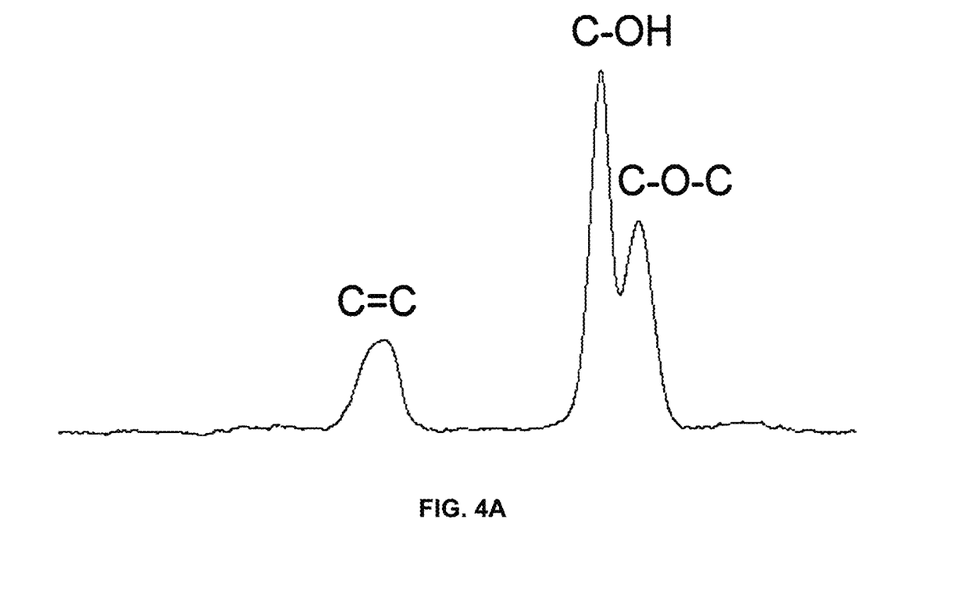
FIG. 4A is a graph illustrating the $^{13}C$ solid-state NMR analysis result of the high heat-resistant graphene oxide according to the present invention.
Figure 4B:
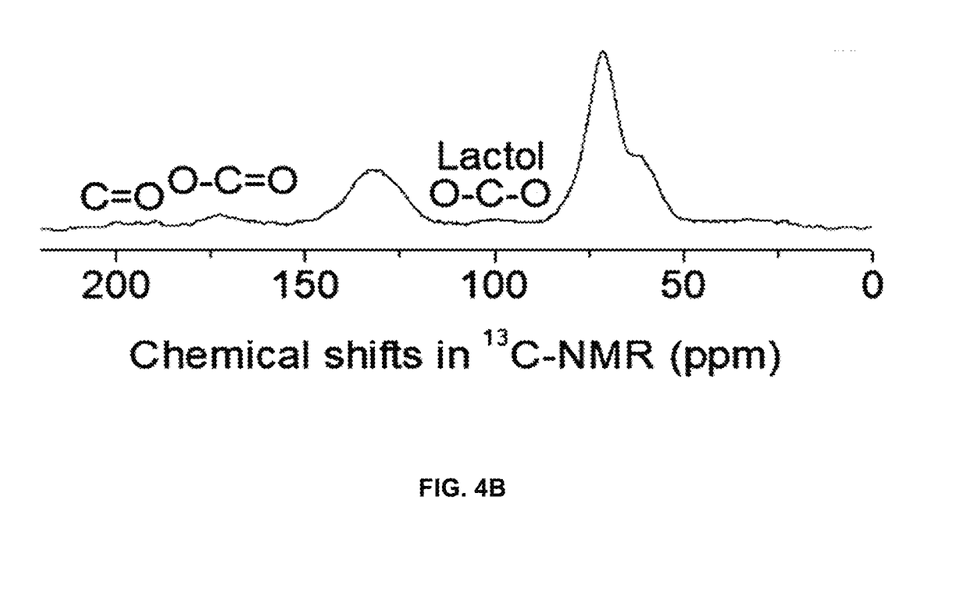
FIG. 4B is a graph illustrating the $^{13}C$ solid-state NMR analysis result of the conventional graphene oxide.

FIG. 4 is a graph showing the $^{13}$C solid-state NMR analysis result of high heat-resistant graphene oxide according to the present invention and the $^{13}$C solid-state NMR analysis result of conventional graphene oxide. FIG. 4A is the $^{13}$C solid-state NMR analysis result of high heat-resistant graphene oxide used in the present invention, and FIG. 4B is a graph showing the $^{13}$C solid-state NMR analysis result of conventional graphene oxide.

Referring to the drawings, it can be confirmed that the high heat-resistant graphene oxide shown in FIG. 4A has a carbon-carbon double bond derived from the graphite structure, a hydroxyl group, and an epoxy group but does not have a carboxyl group and a lactol group on the surface, and it is confirmed that the conventional graphene oxide shown in 4B has a hydroxyl group and a carbonyl group, a carboxyl group, and a lactol group, which have a relatively higher oxidation degree than that of hydroxy and epoxy groups.

Figure 5:
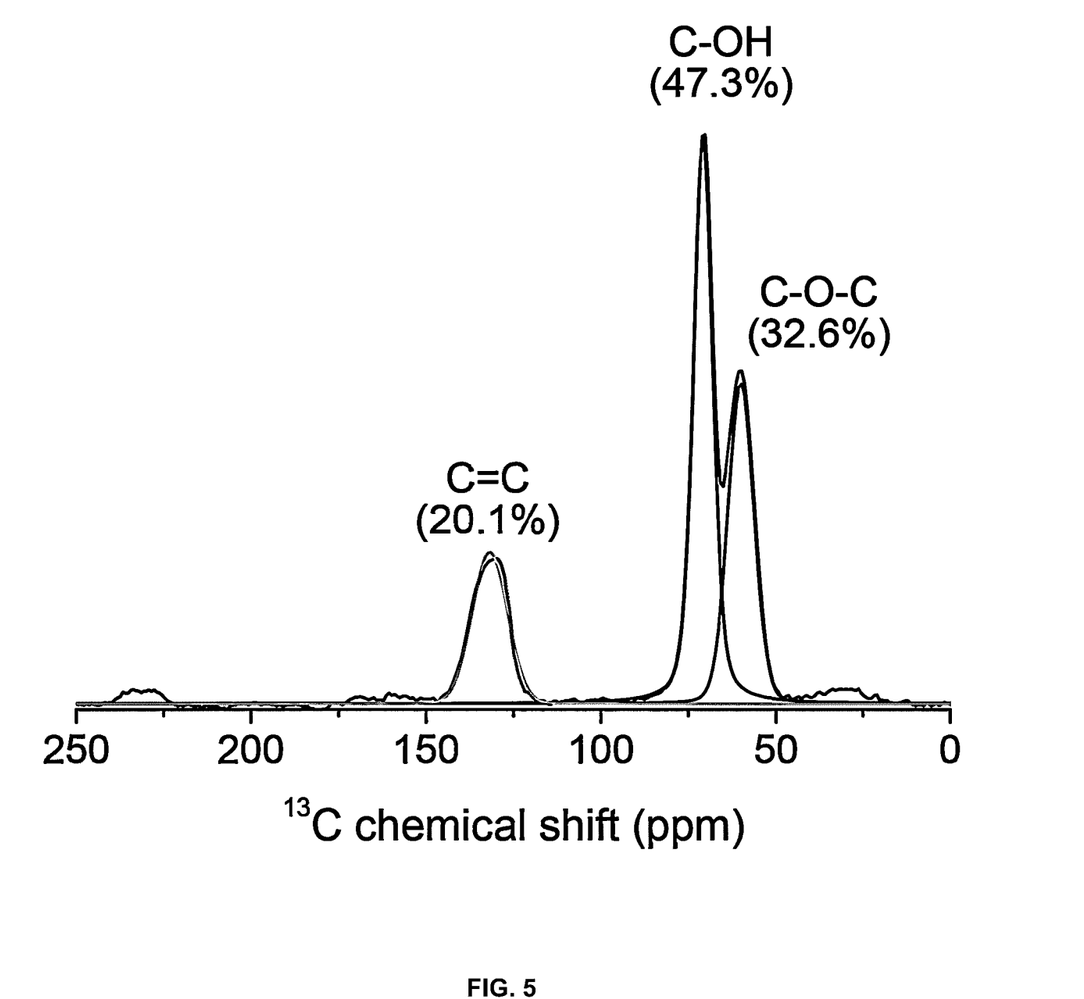
FIG. 5 is a graph illustrating $^{13}C$ solid NMR analysis calculated according to an area ratio (area %) from FIG. 4A.

FIG. 5 is a $^{13}$C solid NMR analysis graph calculated from the area ratio (area %) of FIG. 4A. Referring to this, the hydroxyl group accounts for 47.3% and the epoxy group accounts for 32.6%, resulting in a total oxidation degree of 79.9%. Thus, it is confirmed that the oxidation degree is high. The carbon-carbon double bonds account for 20.1%.

Figure 6:
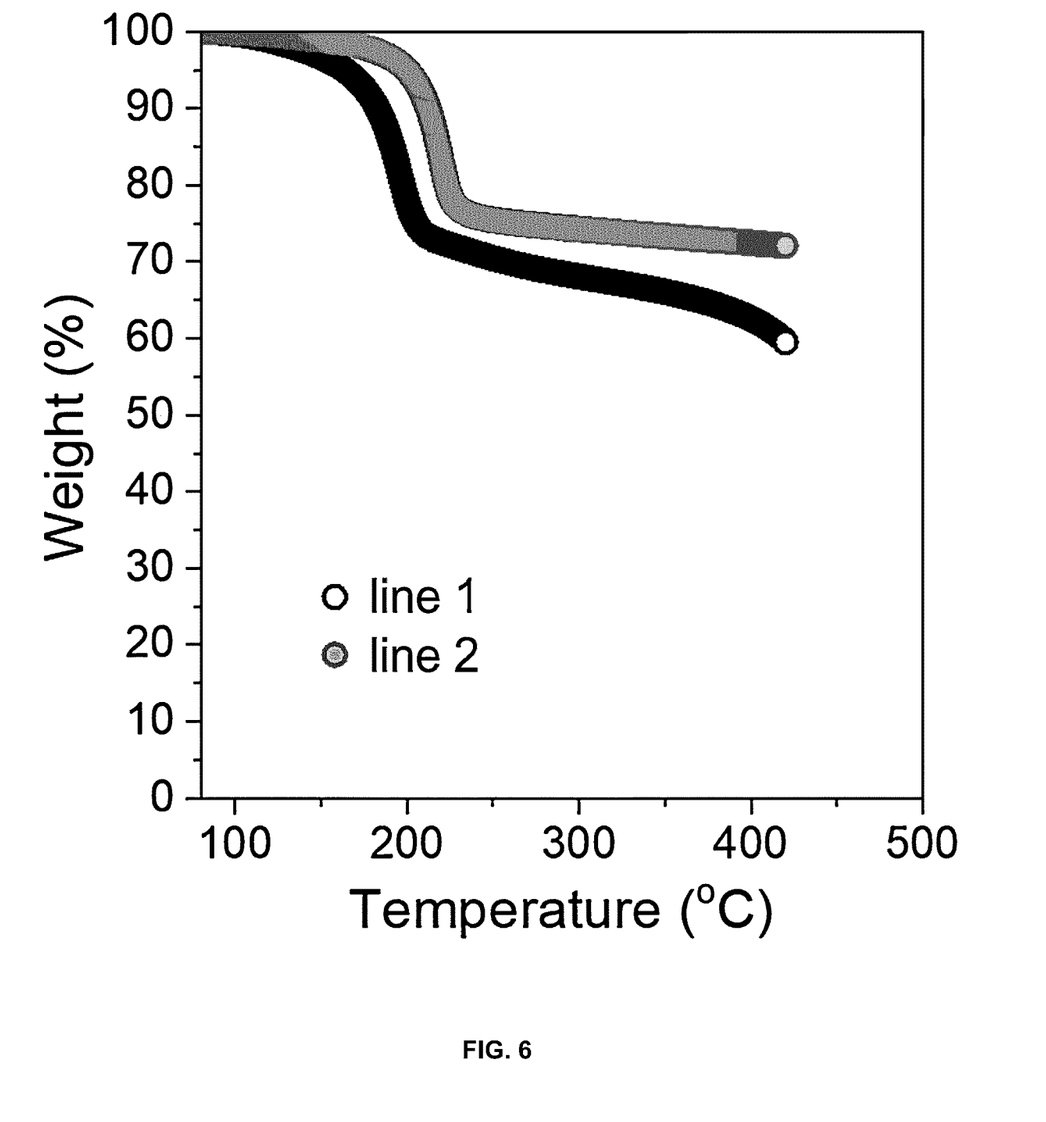
FIG. 6 is a graph illustrating thermogravimetric analysis (TGA) results of high heat-resistant graphene oxide according to the present invention and conventional graphene oxide.

FIG. 6 is a graph showing thermogravimetric analysis (TGA) of high heat-resistant graphene oxide according to the present invention and conventional graphene oxide, in which Line 1 represents conventional graphene oxide, and Line 2 represents graphene oxide of the present invention. However, the measurement of the solid content of graphene oxide as in FIG. 6 may be performed at 0.5 to 5° C./min in air by thermogravimetric analysis.

This indicates how much solid content remains when burning graphene oxide in air while the temperature is raised from 100° C. to 450° C., starting at room temperature. It is found that in the case of the high heat-resistant graphene oxide (Line 2) used in the present invention, oxidation insignificantly occurs whereby the solid content was maintained in an amount of 95% by weight or more at 200° C. and higher and 65% by weight or higher and 80% by weight or less at 400° C. On the other hand, it is confirmed that the conventional graphene oxide (Line 1) has a solid content of 80% by weight or less at 200° C., and oxidation severely occurs in air at 400° C., so that the solid content rapidly drops to 60% by weight or less.

That is, conventional graphene oxide having an oxygen-containing functional group is easily deteriorated in air and burns due to the nature thereof, and the high heat-resistant graphene oxide used in the present invention has thermal stability to withstand heat until reaching about 450° C. Specifically, the high heat-resistant graphene oxide (Line 2) maintains a solid content close to 100% by weight because the solid content does not decrease in a relatively low temperature range of 100° C. to 200° C., exhibits behavior in which the oxygen-containing functional groups are removed whereby the weight rapidly decreases in a temperature range of 200° C. to 250° C., and enters a state in which the solid content is stabilized and maintained in a range of 65% to 80% by weight in a temperature range of 250° C. to 450° C.

The reason for showing a high solid content of 95% by weight or more even at 200° C. in the present invention as shown in FIG. 6 is that the carboxyl and lactol groups, which have a relatively high oxidation degree compared to the epoxy and hydroxyl groups do not exist on the surface. In a low temperature range of 200° C. to 250° C., only the epoxy and hydroxyl groups that have a low oxidation degree are removed, and reduction occurs to produce a hexagonal structure having an sp$^2$ bond structure. Thus, the oxidation of graphene oxide due to air occurs less. Therefore, at 400° C., the residual solid content is maintained at 65% by weight or more.

Figure 7:
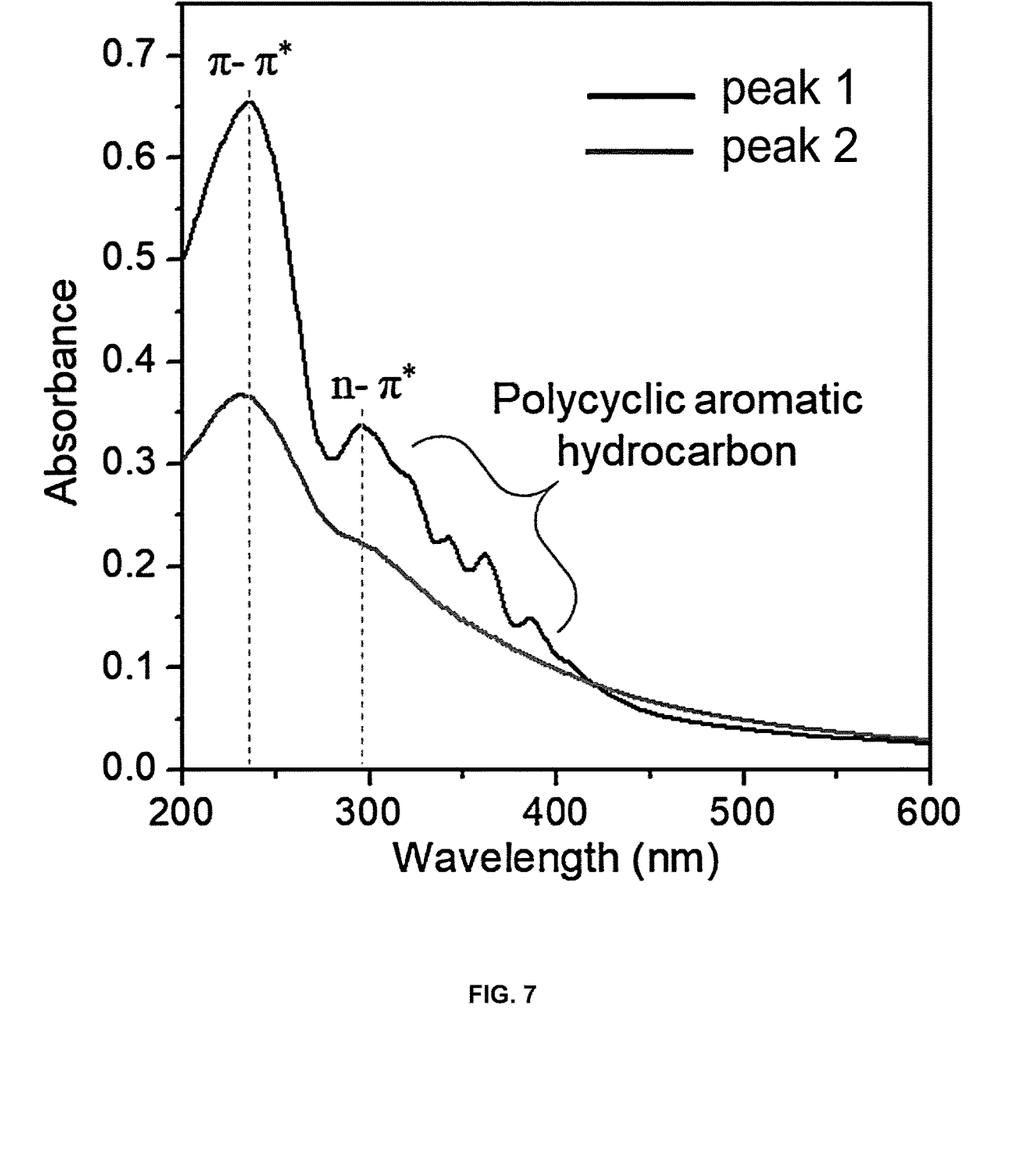
FIG. 7 is a graph illustrating ultraviolet-visible spectroscopic analysis results of high heat-resistant graphene oxide according to the present invention and conventional graphene oxide.

In addition, FIG. 7 shows ultraviolet-visible spectroscopic analysis graphs of the high heat-resistant graphene oxide according to the present invention and the conventional graphene oxide, in which peak 1 represents high heat-resistant graphene oxide used in the present invention, and peak 2 represents conventional graphene oxide. Referring to the drawing, at peak 1, unlike peak 2, polycyclic aromatic hydrocarbons (PAHs) that form sp$^2$ bonds between carbon atoms appear. This is because after the epoxy group and the hydroxyl group included in the graphene oxide in which the lactol group and the carboxyl group are not present are removed in a temperature range of 200° C. to 250° C., and polycyclic aromatic hydrocarbons are generated through the reduction.

From the results of FIGS. 2 to 7, it is confirmed that as described above, the high heat-resistant graphene oxide used in the present invention does not have a lactol group and a carboxyl group that have a high oxidation degree on the surface thereof, whereby the original graphene structure dominantly exists and there is no oxidation-inducing structure. For this reason, the graphene oxide exhibits thermal stability that deterioration of the graphene oxide dopes not occur in a temperature range of 250° C. to 450° C.

Preferably, in the present invention, to prepare the high heat-resistant graphene oxide having a structure in which an oxygen-containing functional group that is an epoxy group or a hydroxyl group is present on the surface but an oxygen-containing functional group that is a lactol group or a carboxyl group is not present on the surface, a preparation method described below is used. In the method, graphite and chlorate (ClO3$^-$)-based oxidizing agent are mixed in a powder state, and concentrated nitric acid is then added to the powder mixture so that the powder mixture undergoes oxidation to produce graphite oxide. Next, the graphite oxide undergoes exfoliation in an alkaline condition of pH 10 or higher obtained using a basic solution without containing metal ions.

More specifically, graphite and a chlorate-based oxidizing agent are mixed in a powder state, a small amount of a strong acid such as concentrated nitric acid is then added to the powder mixture for oxidation at room temperature, and the functional groups on the surface or etches of the graphite oxide are substituted with oxygen-containing functional groups to form graphite oxide. After that, the pH is controlled to be 10 or higher with a basic solution that does not contain metal ions in graphite oxide, that is, an alkali condition is built, and heat is applied for exfoliation of the graphite oxide. In this manner, it is possible to remove lactol groups and carboxyl groups, which have a relatively higher oxidation degree than epoxy groups and hydroxyl groups, from the surface. Through this, it is possible to produce graphene oxide having no lactol groups and carboxyl groups on the surface from the beginning rather than removing lactol groups and carboxyl groups from graphene oxide in which epoxy groups, hydroxy groups, lactol groups, and carboxyl groups are coupled to the surface and edges through an additional removal process.

That is, the conventional graphene oxide contains a large number of oxygen-containing functional groups with a high oxidation degree because the graphite is oxidized using strong oxidizing agents such as sulfuric acid and potassium permanganate, whereas the high heat-resistant graphene oxide of the present invention is characteristic in that the chlorate-based oxidizing agent used for oxidation of graphite prevents the formation of lactol groups and carboxyl groups. Here, when the graphite oxide is separated or exfoliated, alkaline conditions are made using a basic solution that does not contain metal ions. Therefore, lactol and carboxyl groups are not formed, and metal oxidation does not because metal ions are not contained. Thus, the graphene oxide has thermal resistance and stability.

When exfoliating graphite oxide, an alkali condition is made with a basic solution containing metal ions such as sodium hydroxide (NaOH) or potassium hydroxide (KOH), the metal oxidizes itself, and metal ions such as sodium ions or potassium ions attach to the surface of the graphene oxide. Therefore, the graphene oxide is easily deteriorated, starting from the metal ion-attached portion. This means that the graphene oxide is not thermally stable. Moreover, in the case of the conventional graphene oxide, in the process of synthesizing graphene oxide by using graphite, an oxygen-containing functional group is introduced into graphene when graphite is oxidized. In the process, since there is a large amount of oxygen, oxidation severely occurs, so that an empty space represented by "A" in FIG. 2 is generated. At this time, the oxygen-containing functional group is easily introduced into the empty space, and burning is started from here so that deterioration rapidly progresses at a high temperature such as 400° C. or higher. For this reason, it is difficult to reliably achieve high heat resistance.

On the other hand, as described above, high heat-resistant graphene oxide used in the present invention is oxidized by a chlorate-based oxidizing agent to prepare graphite oxide in which lactol groups and carboxyl groups are not present, and a basic solution containing no metal ions is used to exfoliate the graphite oxide to form graphene oxide. Therefore, the original graphene structure in which carbon-carbon double bonds form an $sp^2$ hybrid orbital is formed without empty spaces being formed.

Figure 8:
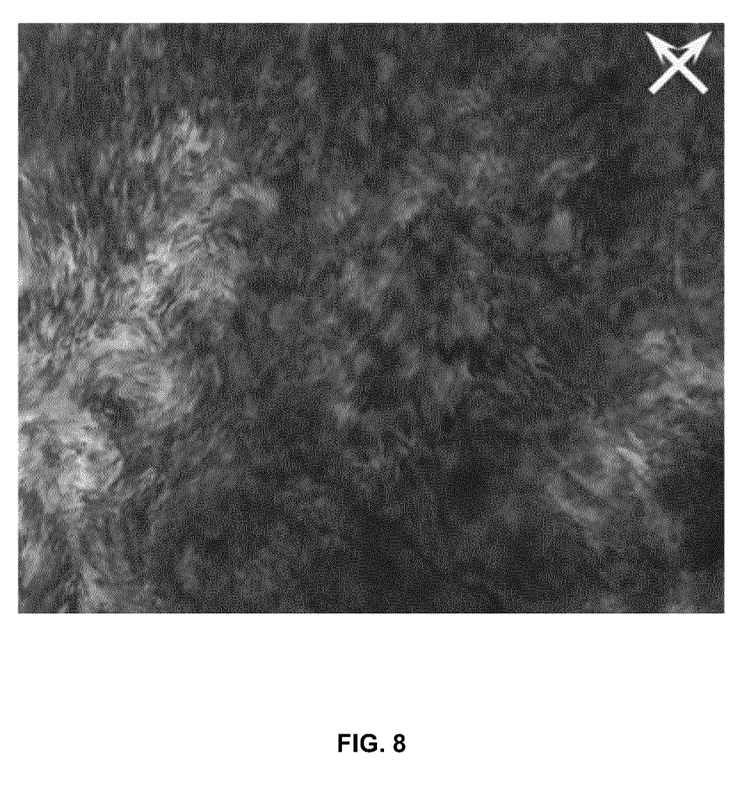
FIG. 8 is a 50-fold polarization microscope image showing the graphene oxide solution according to the present invention.

The graphite oxide oxidized by chlorate is exfoliated with a basic solution that does not contain metal ions as described above, and an graphene oxide solution containing high heat-resistant graphene oxide is used as a spinning solution. In order to be used as a spinning solution, a liquid crystal phase should be exhibited. Referring to FIG. 8 showing the graphene oxide solution according to the present invention as a polarizing microscope image (50-fold magnification), liquid-phase graphene oxide having a solid content of 1% to 2% by weight can be found.

Next, the spinning solution is wet spinning to prepare a graphene oxide fiber (S20).

The prepared graphene oxide spinning solution is subjected to wet spinning in in a coagulation bath containing a metal-free acid solution as a coagulant, thereby producing graphene oxide fibers. Specifically, graphene oxide fibers may be prepared by wet spinning the graphene oxide spinning solution into the coagulation bath through a spinneret.

In particular, graphene oxide is cross-linked by hydrogen bonding without intervention of metal ions such as metal divalent cations or metal trivalent cations, thereby producing graphene oxide fibers. Epoxy groups or hydroxyl groups on the surface are hydrogen-bonded with each other in an acid solution so that a plurality of graphene oxide molecules is connected to each other and solidified to produce graphene oxide fibers. As the spinning solution is wet-spun in the coagulation bath, the epoxy groups or hydroxyl groups of the graphene oxide contained in the spinning solution are hydrogen-bonded to each other in the acid solution to cross-link between the graphene oxide molecules so that the graphene oxide solidifies into fibers to form graphene oxide fibers.

During the spinning of the graphene oxide spinning solution in the coagulation bath containing an acid solution that does not contain metal cations as a coagulant, the reason why hydrogen bonds are formed by the attraction between oxygen and hydrogen that highly differ in electronegativity is because oxygen and hydrogen, which have a large difference in electronegativity, combine to exhibit high polarity. In addition, since the hydrogen atom has a small size because the hydrogen atom does not have an internal electron that can block the nucleus, the hydrogen molecules can approach very closely.

According to the present invention, the coagulant is preferably an acid solution which does not contain metal cations but contain hydrogen ions. The acid solution is one or more acids selected from formic acid (HCOOH), carbonic acid ($H_2CO_3$), oxalic acid ($H_2C_2O_4$), acetic acid ($CH_3COOH$), hydrochloric acid (HCl), nitric acid ($HNO_3$), and sulfuric acid ($H_2SO_4$). Formic acid (HCOOH), carbonic acid ($H_2CO_3$), oxalic acid ($H_2C_2O_4$), and acetic acid ($CH_3COOH$) are weak acids, and hydrochloric acid (HCl), nitric acid ($HNO_3$), and sulfuric acid ($H_2SO_4$) are strong acids. Aside from the acids described above, any solution having the properties of an acid can be used.

That is, in the present invention, since an acid solution that does not use a coagulation bath containing a material containing metal cations as a coagulant is used, metal ions are not included in the finally manufactured graphene fiber. Therefore, it is possible to prevent the thermal resistance and the electrical conductivity from being deteriorated. Therefore, the graphene oxide fibers exhibits good electrical conductivity while maintaining heat resistance of graphene oxide.

Furthermore, in the present invention, since high heat-resistant graphene oxide that does not have carboxyl groups or lactol groups, which are easily electrostatically bonded to metal ions, is used, the epoxy groups or hydroxyl groups present on the surface of the high heat-resistant graphene oxide are hydrogen-bonded in an acid solution that does not contain metal ions but contains hydrogen ions, so that the graphene oxide molecules are cross-linked, thereby coagulating into a fiber form. Thus, it is possible to prepare graphene oxide fibers that do not contain metal ions in the final product.

Finally, a conductive graphene fiber is prepared by reducing the graphene oxide fiber through heat treatment (S30).

That is, in an air environment of a temperature range in which the high heat-resistant graphene oxide exhibits thermal stability, the graphene oxide fiber is heat-treated to be reduced, so that conductive graphene fiber is manufactured.

In another aspect, the present invention provides conductive graphene fibers manufactured by the above-described method.

Figure 9A:
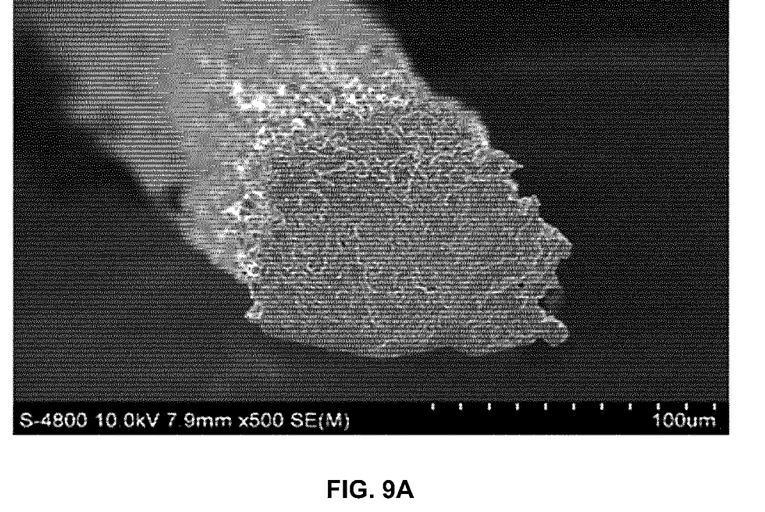
FIGS. 9A and 9B are SEM images showing a conductive graphene fiber prepared according to the present invention.
Figure 9B:
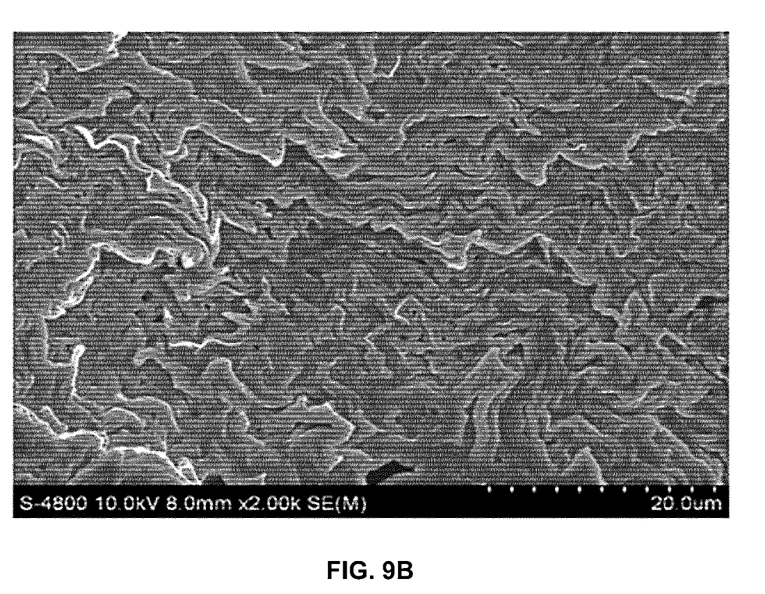
Figure 10:
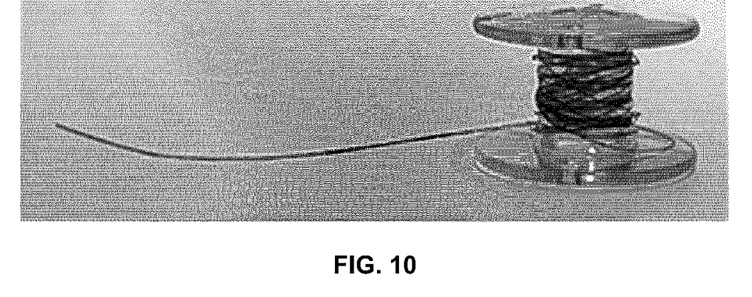
FIG. 10 is a photograph showing the wound state of the conductive graphene fiber prepared according to the present invention.

Regarding this, FIG. 9 is an SEM image of the conductive graphene fiber manufactured according to the present invention. FIG. 9A is a 500-fold SEM image of the conductive graphene fiber, and FIG. 9B is a 2000-fold SEM image of the conductive graphene fiber. FIG. 10 is a photograph showing a state in which the conductive graphene fiber prepared according to the present invention is wound on a bobbin. Referring to FIGS. 9 and 10, it is possible to confirm that a wire-shaped conductive graphene fiber can be manufactured by the manufacturing method of the present invention.

Figure 11:
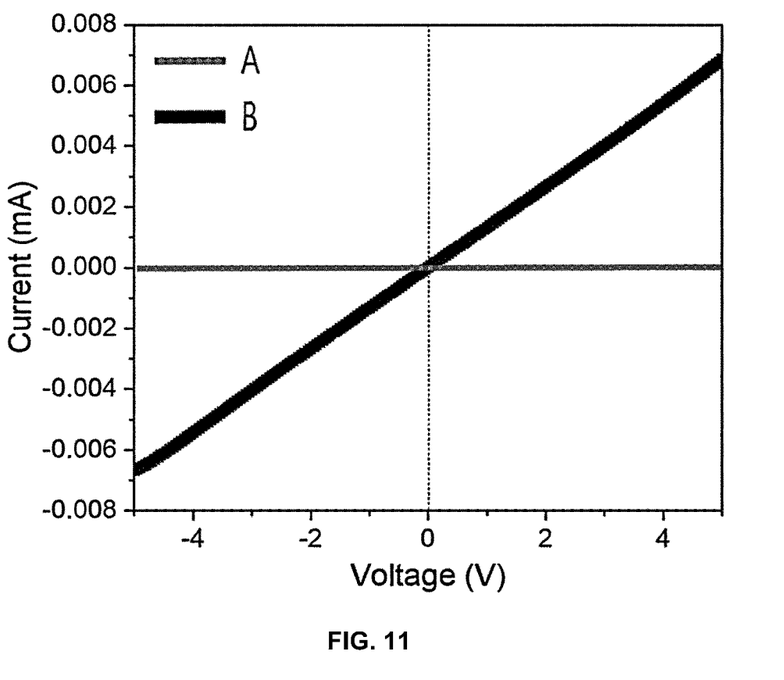
FIG. 11 is a graph showing the electrical properties of conductive graphene fiber prepared according to the present invention.

FIG. 11 is a graph showing the electrical properties of the conductive graphene fibers prepared according to the present invention. As shown in a portion denoted by A in FIG. 11, no current flows by the applied voltage before heat treatment. However, as shown in a portion denoted by B in FIG. 11, after heat treatment for 1 hour in an air ambient condition, current flows when voltage is applied because the graphene oxide is reduced through the heat treatment. Through this, it is confirmed that the conductive graphene fibers prepared in the present invention exhibit the electrical properties of graphene.

As described above, the present invention relates to a high heat-resistant graphene oxide, a method of manufacturing conductive graphene fibers from the same, and conductive graphene fibers manufactured by the method. Accordingly, since the heat treatment process performed under a high temperature and an inert gas environment is not performed, good economic efficiency can be obtained. In addition, since it is possible to control the defects of graphene generated by the high temperature heat treatment process, conductive graphene fibers with high quality can be manufactured in high yield.

That is, in the method of manufacturing conductive graphene fibers having thermal resistance and stability of the present invention, the graphene oxide is high heat-resistant graphene oxide exhibiting thermal resistance and stability in a temperature range of 200° C. to 450° C. In the process of manufacturing reduced conductive graphene fibers through heat treatment, the high heat-resistant graphene oxide fiber is reduced through heat treatment performed in an air environment and in a temperature range of 200° C. to 450° C.

In particular, since the high heat-resistant graphene oxide of the present invention does not have a carboxyl group and a lactol group, which are easily electrostatically bonded to metal ions, and a defect structure developed on the surface, an acid solution in which hydrogen ions are present induces hydrogen bonding so that epoxy groups or hydroxyl groups are hydrogen-bonded with each other. Thus, the graphene oxide solidify into graphene oxide fibers. When the graphene oxide fibers undergoes reduction through heat treatment, thermal resistance and stability of the graphene oxide fibers can be improved. In addition, since the spinning solution is wet-spun in a coagulation bath containing an acid solution not containing metal cations as a coagulant, the distance between the graphene molecules of the conductive graphene fibers can be reduced, so that the electrical conductivity can also be improved.

Hereinafter, examples of the present invention will be described in detail. The examples below are provided only to aid understanding of the present disclosure and thus should not be construed as limiting to the scope of the present invention.

Example 1

1-1. Manufacturing of Graphene Oxide Spinning Solution

First, high heat-resistant graphene oxide for wet spinning was prepared by a method described below. 10 g of graphite and 75 g of sodium chlorate ($NaClO_3$) were mixed in a powder state, and then 50 mL of concentrated nitric acid was added to the powder mixture for oxidation. The oxidation was performed at room temperature for 1 to 3 hours. Next, 1 L of distilled water was added to neutralize the solution, 1 L of 1M hydrochloric acid solution was added, and centrifugation was performed twice at 1,000 rpm to prepare purified graphite oxide. Next, pH control was performed with an ammonia solution such that the pH became 10 or higher. Under alkaline conditions, the graphite oxide was exfoliated with an ultrasonic disperser to produce graphene oxide. Thereafter, distilled water was added and centrifugation was performed to prepare an graphene oxide spinning solution which is an aqueous solution.

Referring to FIG. 8 showing a polarization microscope image of the graphene oxide spinning solution, the solid content is 1.8% by weight and a liquid crystal phase is shown. This means that liquid crystal spinning can be performed.

1-2. Manufacturing of Graphene Oxide Fiber

The graphene oxide spinning solution prepared in Example 1-1 was wet-spun into a coagulation bath that is adjusted to pH 2 or less with acetic acid through a 18 G-size spinning nozzle to prepare graphene oxide gel fibers. The graphene oxide gel fibers were washed with distilled water and then dried at room temperature to prepare graphene oxide fibers.

1-3. Manufacturing of Conductive Graphene Fiber

The graphene oxide fibers prepared in Example 1-2 were heat-treated in an oven heated to 250° C. in air for 1 hour to prepare conductive graphene fibers.

FIG. 11 shows the electrical properties of the conductive graphene fibers prepared in Examples 1-3. The graphene oxide was reduced, and the electrical properties of graphene were tested. As denoted by A in FIG. 11, it was confirmed that, although no current flowed under voltage application in the sample that is not heat-treated, the heat-treated sample exhibited conductivity, that is, a current of 0.0026 mA flowed when a voltage of 2 V is applied in the heat-treated sample. However, such electrical conductivity may vary depending on the heat treatment temperature and time.

The present invention is characterized in that it is possible to manufacture high heat-resistant graphene oxide having an oxygen-containing functional group such as an epoxy group or a hydroxyl group on the surface and not having an oxygen-containing functional group such as a lactol group or a carboxyl group on the surface, thereby exhibiting thermal resistance and stability. In addition, graphene oxide fibers manufactured by wet-spinning the high heat-resistant graphene oxide are heat-treated in an air environment in a temperature range in which the high heat-resistant graphene oxide exhibits thermal stability so as to be reduced, resulting in production of conductive graphene fibers.

Accordingly, a large number of sp2 bonds exist on the surface of graphene oxide, and hydroxyl and epoxy groups having a relatively lower oxidation degree than carboxyl and lactol groups exist on the surface of graphene oxide, after most of the hydroxyl and epoxy groups are removed at temperatures in a range of 200° C. to 250° C., the graphene oxide has thermal resistance and stability such that deterioration proceeds very slowly and is minimized. Thus, heat treatment, which was conventionally performed at a high temperature in the range of 800° C. to 1,200° C. in an inert gas environment, can be performed at a low temperature and in an air environment. Therefore, there is the effect of not only lowering the cost but also remarkably improving the convenience and efficiency of the process.

In particular, on the surface of the high heat-resistant graphene oxide of the present invention, there is no oxygen-containing functional group such as a carboxyl group or a lactol group that forms an electrostatic bond with a metal ion, but there is an epoxy group or a hydroxyl group having a relatively lower oxidation degree than the former oxygen-containing functional groups. Therefore, epoxy groups or hydroxyl groups are hydrogen-bonded with each other in an acid solution to crosslink between graphene oxide molecules whereby the graphene oxide solidifies into graphene oxide fibers.

In addition, according to the present invention, since metal oxidation does not occur due to the use of an acid solution that does not contain metal cations, the conductive graphene fibers can have thermal stability. In addition, only by wet spinning of a spinning solution into a coagulation bath containing an acid solution that does not contain metal cations as a coagulant, the epoxy groups or hydroxyl groups on the surface of graphene oxide are hydrogen-bonded to cause graphene oxide molecules to cross-link with each other. In addition, in the conductive graphene fibers manufactured by the subsequent heat treatment for reduction, since the distance between the graphene molecules can be reduced, the electrical conductivity can be improved. Therefore, the present invention is meaningful.

The embodiments that have been described herein above are merely illustrative of the technical idea of the present invention, and thus various modifications, changes, alterations, substitutions, subtractions, and additions may also be made by those skilled in the art without departing from the gist of the present disclosure. The embodiments disclosed in the present disclosure are not intended to limit the scope of the present invention and the technical spirit of the present invention should not be construed as being limited to the embodiments. The protection scope of the present disclosure should be construed as defined in the following claims, and it is apparent that all technical ideas equivalent thereto fall within the scope of the present invention.

What is claimed is:

1. A high heat-resistant graphene oxide comprising:
    a graphene oxide without a lactol group or a carboxyl group as an oxygen-containing function group on a surface thereof,
    wherein the graphene oxide comprises an epoxy group hydrogen bonded to another epoxy group as an oxygen-containing functional group on the surface.

2. The high heat-resistant graphene oxide of claim 1, wherein the graphene oxide is high heat-resistant graphene oxide exhibiting thermal resistance and stability in a temperature range of 200° C. to 450° C.

3. The high heat-resistant graphene oxide of claim 1, wherein the graphene oxide is high heat-resistant graphene oxide formed by a method in which graphite and a chlorate-based oxidizing agent in a powder form are mixed, concentrated nitric acid is added to a powder mixture for oxidation to form graphite oxide, and the graphite oxide is exfoliated under an alkali condition of pH 10 or higher obtained using a basic solution that does not contain metal ions.

4. A method of manufacturing conductive graphene fiber from high heat-resistant graphene oxide, the method comprising:
    a first step of preparing a spinning solution containing graphene oxide;
    a second step of preparing graphene oxide fiber by wet spinning the spinning solution to form epoxy groups hydrogen-bonded to other epoxy groups on a surface of the graphene oxide; and
    a third step of preparing conductive graphene fiber by reducing the graphene oxide fiber through heat treatment,
    wherein the graphene oxide is high heat-resistant graphene oxide not having a lactol group or a carboxyl group as an oxygen-containing function group on the surface thereof but having an epoxy group or a hydroxyl group as an oxygen-containing functional group on the surface, thereby exhibiting thermal resistance, and
    wherein the heat treatment is performed in an air environment in a temperature range in which the high heat-resistant graphene oxide exhibits thermal stability.

5. The method of claim 4, wherein in the second step, the graphene oxide fiber is prepared by wet spinning the spinning solution in a coagulation bath containing a metal cation-free acid solution as a coagulant, and the graphene oxide fiber is formed by a mechanism in which epoxy groups or hydroxyl groups on the surface of the graphene oxide are hydrogen-bonded to each other by the acid solution, and the graphene oxide is connected to each other and solidified.

6. The method of claim 5, wherein the acid solution comprises at least one selected from formic acid (HCOOH), carbonic acid (H2CO3), oxalic acid (H2C2O4), acetic acid (CH3COOH), hydrochloric acid (HCl), nitric acid (HNO3), and sulfuric acid (H2SO4).

7. The method of claim 4, wherein the third step is a process of reducing the high heat-resistant graphene oxide through heat treatment in an air environment in a temperature range of 200° C. to 450° C.

8. A conductive graphene fiber manufactured by the method of claim 4.

9. The high heat-resistant graphene oxide of claim 1, wherein the hydrogen bond in the epoxy group on the high heat-resistant graphene oxide does not combust at an air temperature between 250° C. and 450° C., and a similar hydrogen bond in a similar epoxy group on a conventional graphene oxide is removed at an air temperature between 200° C. and 250° C.

10. The high heat-resistant graphene oxide of claim 1, wherein a graphene oxide is formed from oxidation of graphite in an alkaline solution of pH 10 or greater, wherein the alkaline solution does not comprise metal ions.

11. The high heat-resistant graphene oxide of claim 1, wherein the lactol group and the carboxyl group define a higher oxidation number than the epoxy group present on the surface.

12. A graphene oxide, comprising:
    an oxygen-containing function group on a surface of the graphene oxide comprising a solid content of 95 wt % or more at 200° C. and between 65-80 wt % at 400° C.; and
    an epoxy group hydrogen bonded to a hydroxyl group on the surface.

13. The graphene oxide of claim 12, wherein at least one of a lactol group and a carboxyl group on the surface of the graphene oxide is reduced to at least one of the epoxy group and the hydroxyl group on the surface.

14. The graphene oxide of claim 12, wherein the epoxy group forms sp2 bonds between carbon atoms and the hydroxyl group forms sp2 bonds between carbon atoms.

15. The graphene oxide of claim 12, wherein an air temperature reduces at least one of a lactol group and a carboxyl group on the surface of the graphene oxide to the hydroxyl group.

16. The graphene oxide of claim 12, wherein the graphene oxide is a high heat-resistant graphene oxide formed in an alkaline solution of pH 10 or greater that does not comprise a metal ion.

17. The graphene oxide of claim 12, wherein the graphene oxide is a high heat-resistant graphene oxide wherein the graphene oxide does not comprise a lactol group or a carboxyl group as an oxygen-containing functional group.

18. The method of claim 4, wherein graphite is exfoliated in an alkaline solution of pH 10 or greater, and the alkaline solution does not comprise a metal ion.

19. A method of manufacturing conductive graphene fiber from high heat-resistant graphene oxide, comprising:

preparing a spinning solution containing graphene oxide by wet spinning the spinning solution in a coagulation bath containing a metal cation-free acid solution as a coagulant, and the graphene oxide fiber is formed by a mechanism in which epoxy groups or hydroxyl groups on a surface of the graphene oxide are hydrogen-bonded to each other by the acid solution, and the graphene oxide is connected to each other and solidified;

wet spinning the spinning solution to form epoxy groups hydrogen-bonded to other epoxy groups on the surface of the graphene oxide; and preparing conductive graphene fiber by reducing the graphene oxide fiber through heat treatment, wherein:

the graphene oxide is high heat-resistant graphene oxide not having a lactol group or a carboxyl group as an oxygen-containing function group on the surface thereof but having an epoxy group or a hydroxyl group as an oxygen-containing functional group on the surface, thereby exhibiting thermal resistance, and the heat treatment is performed in an air environment in a temperature range in which the high heat-resistant graphene oxide exhibits thermal stability.

20. The method of claim 19, wherein the acid solution comprises at least one selected from formic acid (HCOOH), carbonic acid (H2CO3), oxalic acid (H2C2O4), acetic acid (CH3COOH), hydrochloric acid (HCl), nitric acid (HNO3), and sulfuric acid (H2SO4).

* * * * *